United States Patent
Madera et al.

(10) Patent No.: US 9,963,854 B2
(45) Date of Patent: May 8, 2018

(54) GUARDRAIL WITH TAPERED VERTICAL CHANNEL POST

(71) Applicant: Caterpillar Inc., Peoria, IL (US)

(72) Inventors: Robert J. Madera, Lemont, IL (US);
John M. Teter, North Aurora, IL (US);
Dennis D. Wetterich, Newark, IL (US);
Timothy N. Zier, Oswego, IL (US);
Terril J. Johnson, Washington, IL (US)

(73) Assignee: Caterpillar Inc., Peoria, IL (US)

( * ) Notice: Subject to any disclaimer, the term of this patent is extended or adjusted under 35 U.S.C. 154(b) by 359 days.

(21) Appl. No.: 14/937,294

(22) Filed: Nov. 10, 2015

(65) Prior Publication Data
US 2017/0130424 A1  May 11, 2017

(51) Int. Cl.
*E02F 9/08* (2006.01)
*B60R 3/00* (2006.01)
*E04H 17/20* (2006.01)

(52) U.S. Cl.
CPC ............ *E02F 9/0833* (2013.01); *B60R 3/002* (2013.01); *E04H 17/20* (2013.01)

(58) Field of Classification Search
CPC ... E04F 11/18; E04F 11/1819; E04F 11/1821; E04H 17/1413; E04H 17/146; E04H 17/1476; E04H 17/1482; E04H 17/20; E02F 9/0833; B60R 3/005
See application file for complete search history.

(56) References Cited

U.S. PATENT DOCUMENTS

| | | | |
|---|---|---|---|
| 365,099 A | 6/1887 | Rich | |
| 473,925 A | 5/1892 | Harrington | |
| 519,573 A | 5/1894 | Hamilton | |
| 2,834,621 A | 5/1958 | Scroer | |

(Continued)

FOREIGN PATENT DOCUMENTS

| | | | | |
|---|---|---|---|---|
| CH | 698163 B1 * | 6/2009 | ............ | E04H 17/12 |
| DE | 4134244 A1 * | 4/1993 | ............ | E04F 11/18 |

(Continued)

OTHER PUBLICATIONS

Caterpillar; "988K Wheel Loader"; specalogue; pp. 1-36; 2015.
(Continued)

*Primary Examiner* — Jonathan P Masinick
(74) *Attorney, Agent, or Firm* — Miller, Matthias & Hull

(57) ABSTRACT

A guardrail for a walkway of a machine includes a vertical channel post having an end wall and side walls forming an open channel. The vertical channel post may taper in the side-to-side and fore-aft directions as the post extends bottom to top. The vertical channel post may also transition from a generally rectangular cross-section near the bottom to a more rounded cross-section at the top. Curved top notches at the top of the vertical channel post allow a top rail of the guardrail to rest on top of the post and be attached. Intermediate notches along vertical edges of the side walls receive an intermediate rail of the guardrail. The top notches and the intermediate notches are arranged so that the top rail and the intermediate rail may be vertically aligned and parallel to each other and to the walkway enclosed by the guardrail.

20 Claims, 6 Drawing Sheets

(56) References Cited

U.S. PATENT DOCUMENTS

| | | | | |
|---|---|---|---|---|
| 4,142,711 A | * | 3/1979 | Brimhall | E04H 17/1413 |
| | | | | 256/19 |
| 4,266,318 A | | 5/1981 | Dauwalder | |
| 4,529,174 A | * | 7/1985 | Pickett | E01F 8/0017 |
| | | | | 256/25 |
| 5,649,688 A | | 7/1997 | Baker | |
| 8,646,735 B2 | * | 2/2014 | Bradley | E04H 12/2253 |
| | | | | 248/121 |
| 2009/0140224 A1 | * | 6/2009 | Ratanasiriwilai | E04H 17/12 |
| | | | | 256/2 |

FOREIGN PATENT DOCUMENTS

| | | | | |
|---|---|---|---|---|
| DE | 9217622 U1 | * | 6/1993 | ............ E04F 11/18 |
| DE | 202012103276 U1 | | 10/2012 | |
| EP | 1387019 A2 | | 2/2004 | |
| EP | 1847330 A2 | * | 10/2007 | ......... B21C 37/0803 |
| EP | 3133228 A2 | * | 2/2017 | ......... E04H 17/1413 |
| FR | 2497848 A1 | | 7/1982 | |
| GB | 2443193 A | | 4/2008 | |

OTHER PUBLICATIONS

Caterpillar; "New Guardrail Retrofit Kit"; specalogue; pp. 1-2; 2012.
Komatsu; "PC1250/1250SP-8 Backhoe—C1250-8 Loading Shovel"; brochure; pp. 1-9; 2009.
Rail Exchange, Inc.; "Locomotive Parts"; 2007; http://www.railexchangeinc.com/locomotives.php, 1 page.

* cited by examiner

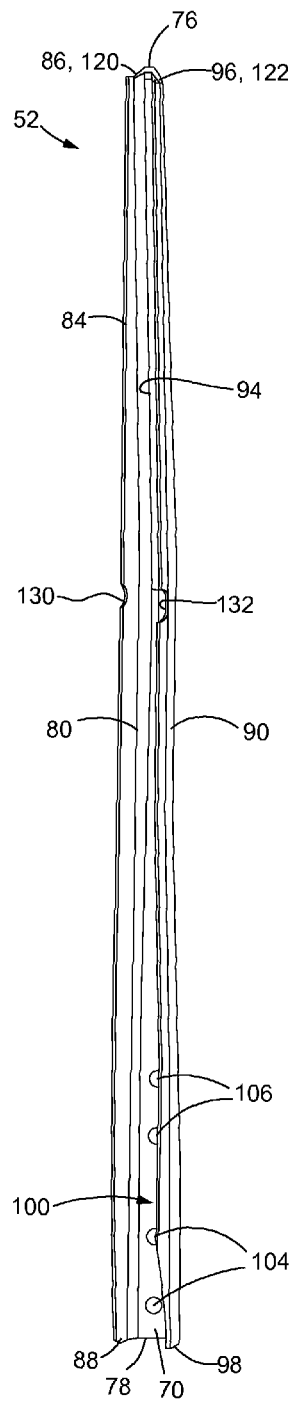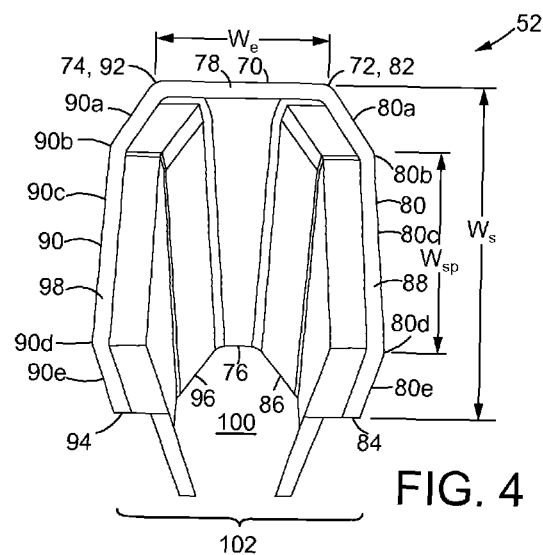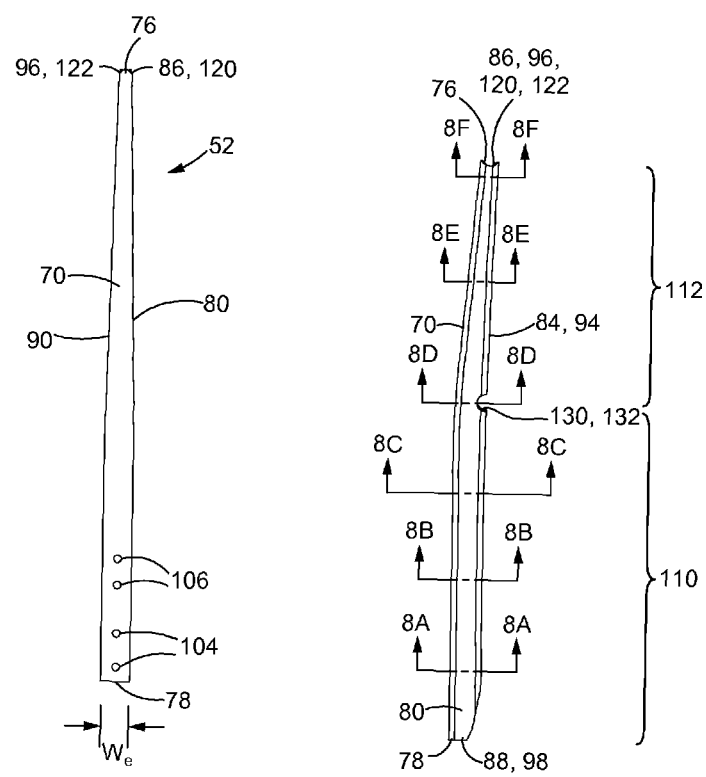
FIG. 3  FIG. 4  FIG. 5  FIG. 6

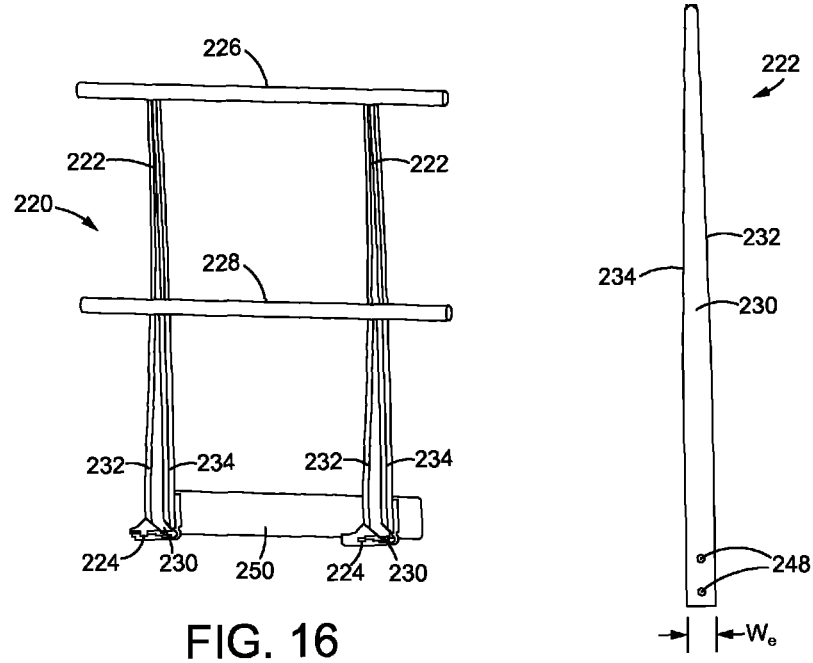
FIG. 16
FIG. 17
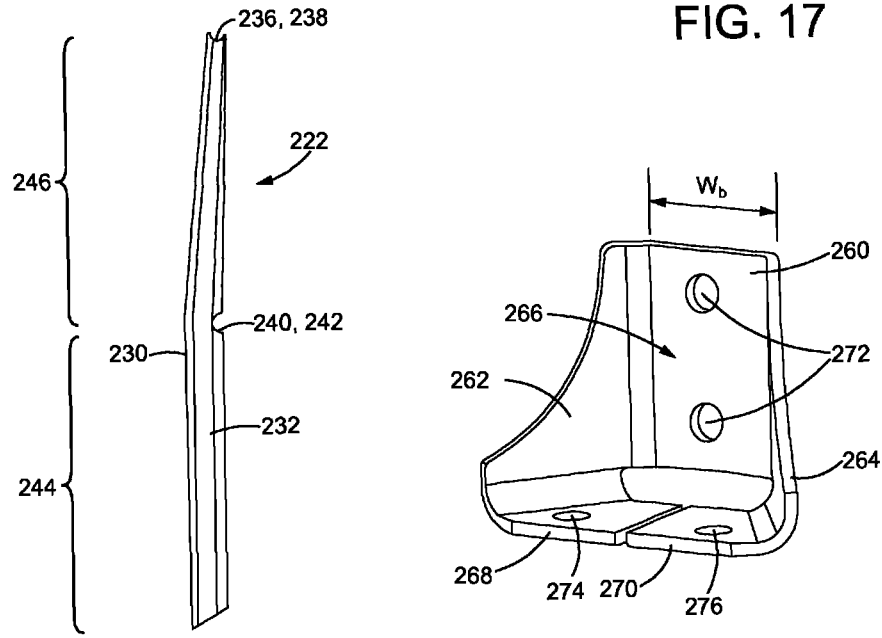
FIG. 18
FIG. 19

GUARDRAIL WITH TAPERED VERTICAL CHANNEL POST

TECHNICAL FIELD

The present disclosure relates generally to guardrail systems for enclosing open access walkways of machines and, in particular, a guardrail system having tapered open-channel vertical channel posts for enclosing a portion of a walkway of a machine in proximity to the operator station of the machine and stairways providing ingress and egress.

BACKGROUND

Off-highway machines, such as large wheel loaders and large mining trucks, are used to transfer material from one place to another. The material is carried in a load-body, or manipulated and/or carried by an implement of the machine. Depending on the particular functions performed by the machine and a desire for improved visibility for the operator over the work area and the material being moved, an operator station of the machine may be located at a height that is substantially elevated above the work surface over which the machine will travel and operate. In some cases, the sheer size of the machines necessitates the operator stations being located high above the work surface.

The elevated operator stations require the machines to be equipped with combinations of stairways, walkways and ladders allowing the operators and maintenance workers to climb up to and climb down from the operator stations. Due to safety concerns, the machines are further equipped with guardrails on the outboard sides of the stairways and walkways to prevent operators of the machines and maintenance workers from falling off the machines. Some known guardrail configurations for machines use an all-tube construction where vertical posts and horizontal rails are made from hollow closed-channel circular tubes. At locations of the guardrails where the vertical posts and horizontal rails intersect, one or both of the intersecting components may be modified or formed so that the components can mate and be connected to each other, typically with welds. In alternative configurations, the horizontal rails may be cut to length to be connected between adjacent vertical posts. In some implementations, guardrails are mounted to outward sides of the walkways or stairways, with mounting brackets being used to attach the lower ends of the vertical posts to the outward side. In other implementations, it may be desirable to mount components to the guardrails, such as hinges and locks for gates, and lights to illuminate the walkways or stairways. Typically, additional mounting brackets are necessary for connecting the components to the vertical posts or the horizontal rails.

SUMMARY OF THE DISCLOSURE

In one aspect of the present disclosure, a vertical channel post for a guardrail for a walkway on a machine is disclosed. The vertical channel post may include an end wall, a first side wall and a second side wall. The end wall may have a first end wall edge, a second end wall edge opposite the first end wall edge, an end wall top edge and an end wall bottom edge opposite the end wall top edge. The first side wall may include a first closed end edge connected to the first end wall edge, a first open end edge opposite the first closed end edge, a first side wall top edge and a first side wall bottom edge opposite the first side wall top edge. The second side wall may include a second closed end edge connected to the second end wall edge, a second open end edge opposite the second closed end edge, a second side wall top edge and a second side wall bottom edge opposite the second side wall top edge. The end wall, the first side wall and the second side wall may define a channel having channel opening defined by the first open end edge and the second open end edge. The first side wall may include a first top notch defined by the first side wall top edge and the second side wall may include a second top notch defined by the second side wall top edge, and the first top notch and the second top notch may be arc-shaped and aligned to receive a top rail of the guardrail. The first side wall may include a first intermediate notch defined by the first open end edge and the second side wall may include a second intermediate notch defined by the second open end edge, and the first intermediate notch and the second intermediate notch may be arc-shaped and aligned to receive an intermediate rail of the guardrail.

In another aspect of the present disclosure, a guardrail for a walkway on a machine is disclosed. The guardrail may include a top rail, an intermediate rail, a first vertical channel post and a second vertical channel post. Each of the first vertical channel post and the second vertical channel post may include an end wall having an end wall top edge and an end wall bottom edge opposite the end wall top edge, a first side wall extending from a first end wall edge of the end wall and having a first open end edge opposite the end wall, and a second side wall extending from a second end wall edge of the end wall and having a second open end edge opposite the end wall, with the end wall, the first side wall and the second side wall defining a channel having a channel opening defined by the first open end edge and the second open end edge. Each of the vertical channel posts may further include a first top notch defined by a first side wall top edge, being arc-shaped and having a first top notch center, a second top notch defined by a second side wall top edge, being arc-shaped and having a second top notch center aligned with the first top notch center to receive and engage the top rail, a first intermediate notch defined by the first open end edge, being arc-shaped and having a first intermediate notch center, and a second intermediate notch defined by the second open end edge, being arc-shaped and having a second intermediate notch center aligned with the first intermediate notch center to receive and engage the intermediate rail.

In a further aspect of the present disclosure, a vertical channel post for a guardrail for a walkway on a machine is disclosed. The vertical channel post may include an end wall, a first side wall and a second side wall. The end wall may have a first end wall edge, a second end wall edge opposite the first end wall edge, an end wall bottom edge and an end wall top edge opposite the end wall bottom edge. The first side wall may include a first closed end edge connected to the first end wall edge, a first open end edge opposite the first closed end edge, a first side wall bottom edge, a first side wall top edge opposite the first side wall bottom edge, a first top notch being arc-shaped and having a first top notch center defined by the first side wall top edge, and a first intermediate notch being arc-shaped and having a first intermediate notch center defined by the first open end edge. The second side wall may include a second closed end edge connected to the second end wall edge, a second open end edge opposite the second closed end edge, a second side wall bottom edge, a second side wall top edge opposite the second side wall bottom edge, a second top notch being arc-shaped and having a second top notch center defined by the second side wall top edge, and a second intermediate notch being arc-shaped and having a second intermediate notch center defined by the second open end edge. The end wall, the first side wall and the second side wall may define a channel having a channel opening defined by the first open end edge and the second open end edge. The first top notch and the second top notch may be aligned to receive a top rail of the guardrail, the first intermediate notch and the second intermediate notch may be arc-shaped and aligned to receive an intermediate rail of the guardrail, and the first top notch center, the second top notch center, the first intermediate notch center and the second intermediate notch center may be aligned so that the top rail and the intermediate rail are parallel and vertically aligned when the top rail is received and engaged by the first top notch and the second top notch, the intermediate rail is received and engaged by the first intermediate notch and the second intermediate notch, and the vertical channel post is oriented vertically. The end wall above the first intermediate notch and the second intermediate notch may extend toward the end wall top edge at an end wall angle relative to a first vertical line toward the channel opening and the first open end edge and the second open end edge above the first intermediate notch and the second intermediate notch may extend toward the first side wall top edge and the second side wall top edge at an open end edge angle relative to a second vertical line away from the end wall.

Additional aspects are defined by the claims of this patent.

BRIEF DESCRIPTION OF THE DRAWINGS

FIG. 3 is an isometric view of a vertical channel post of the guardrail of FIG. 2;

FIG. 4 is a bottom view of the vertical channel post of FIG. 3;

FIG. 5 is a rear view of the vertical channel post of FIG. 3;

FIG. 6 is a side view of the vertical channel post of FIG. 3;

FIG. 16 is an isometric view of an alternative embodiment of a guardrail in accordance with the present disclosure for the machine of FIG. 1;

FIG. 17 is a rear view of the vertical channel post of FIG. 16;

FIG. 18 is a side view of a vertical channel post of the guard rail of FIG. 16; and FIG. 19 is an isometric view of an embodiment of a floor mount bracket in accordance with the present disclosure of the guardrail of FIG. 16.

DETAILED DESCRIPTION

Figure 1:
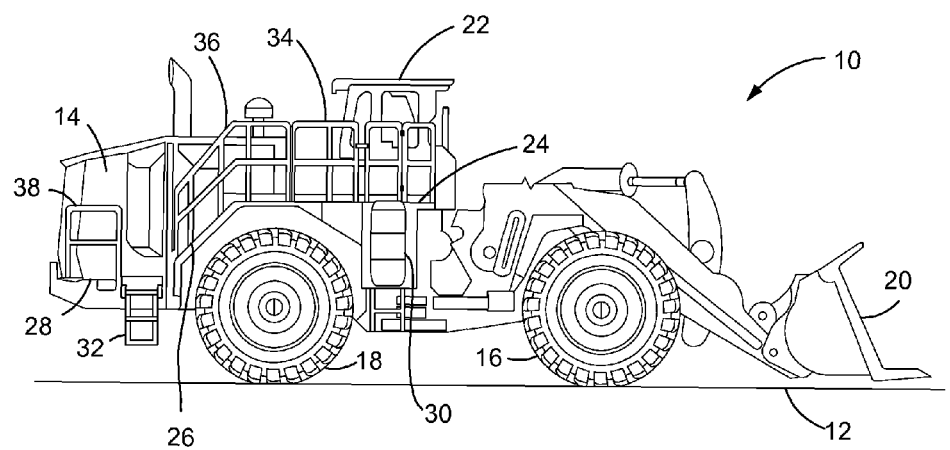
FIG. 1 is a side view of a machine having an elevated operation station with a walkway providing access thereto and an accompanying guardrail.

FIG. 1 shows a machine 10 in the form of a large wheel loader that can travel over a work surface 12 to transfer work material (not shown) from one place to another. The machine 10 may include a body 14 supported on the work surface 12 by traction devices such as front wheels 16 and rear wheels 18. The machine 10 may be powered by a power source (not shown) within the body 14 or outside the body 14 that may drive the rear wheels 18. The machine 10 may include one or more implements 20 that may perform work on the work material and may collect the work material for transport to another location in the work area.

To provide an operator of the machine 10 with visibility over the work area in which the machine 10 is operating, and particularly visibility of the work material on which the implement is operating, an operator station 22 enclosing controls (not shown) for the machine 10 may be located at a top of the machine 10 at a location remote from the work surface 12. To provide access for the operator to the elevated position of the operator station 22, the machine 10 may be provided with one or more means of ingress and egress. As shown in FIG. 1, the machine 10 may include a walkway 24 positioned at the level of the operator station 22 and having a stairway 26 connecting the walkway 24 to a lower platform 28 that may provide a service area for the power source and other internal components (not shown) within the body 14. The machine 10 may further be provided with ladders 30, 32 for the operator to climb to reach the walkway 24 and the lower platform 28, respectively. The operator may be protected against falling off the machine 10 from the walkway 24, the stairway 26 and the lower platform 28 by providing guardrails 34, 36, 38 to enclose the operator while moving about the machine 10.

While the machine 10 as illustrated herein is a large wheel loader, the machine 10 may be any other type of work machine having a size and operating requirements requiring an operator station to be positioned sufficiently high above the ground to require access walkways, stairways, ladders and other means for ingress and egress for the operator station, and security containment such as guardrails to prevent an operator from falling off the machine 10. Such machines may include, but are not limited to, articulated trucks, asphalt pavers, backhoe loaders, cold planers, compactors, bulldozers, large mining equipment, excavators, off-highway trucks, track loaders and the like that may operate above ground, underground in mining and other excavation environments, and in other operating environments. Moreover, each particular machine 10 or configuration of the machine 10 may necessitate a particular composition and configuration of walkways, stairways, platforms and ladders to provide access to the operator stations and other areas of the machine 10 such as service points, storage compartments, and other access to internal components such as the engines and hydraulics of the machine 10. Corresponding guardrail arrangements in accordance with the present disclosure and customized for the particular machine in which the guardrail arrangements are implemented may be installed for providing fall protection for operators and maintenance works navigating around the machine 10.

Figure 2:
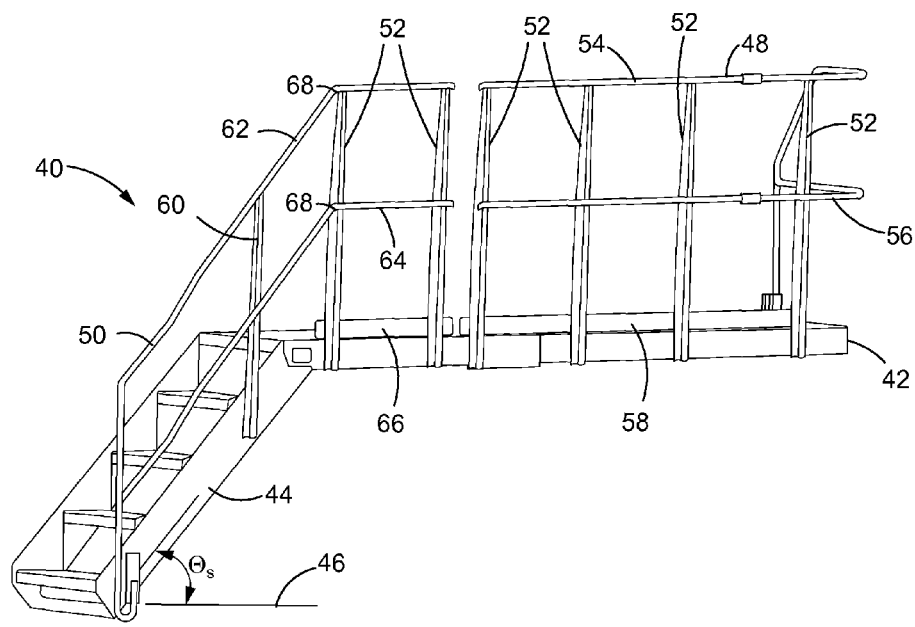
FIG. 2 is an isometric view of a walkway of the machine of FIG. 1 and a guardrail in accordance with the present disclosure.

FIG. 2 illustrates a walkway arrangement 40 for the machine 10 that may include a generally horizontal platform 42 and a stairway 44 extending from proximate a lower portion of the machine 10 to the platform 42 at an incline angle θs relative to a horizontal line 46. The walkway arrangement 40 may further include guardrails 48, 50 secured to outward sides of the platform 42 and the stairway 44 opposite the body 14 of the machine 10 so that an operator or maintenance person is enclosed between the body 14 and the guardrails 48, 50 when on the walkway arrangement 40. The guardrail 48 may include a plurality of vertical channel posts 52 spaced along the outward side of the platform 42 at distances that will provide sufficient support for the operator while not unduly obscuring the operators view of the work area from the platform 42 and the operator station 22. The guardrail 48 may further include a top rail 54 attached at top edges of the vertical channel posts 52, and an intermediate rail 56 attached on an outward side of the vertical channel posts 52 at intermediate positions between the top rail 54 and the platform 42. As will be discussed more fully below, the vertical channel posts 52 may be configured so that the top rail 54 and the intermediate rail 56 may be parallel and vertically aligned when the vertical channel posts 52 are secured to the platform 42 and oriented vertically. The guardrail 48 may also include a toe plate 58 secured to the vertical channel posts 52 proximate a top surface of the platform 42 to prevent an operator's foot from sliding off the platform 42 and causing a fall to the platform 42 or off the machine 10, and to prevent objects such as tools and equipment from falling off the platform 42.

The guardrail 50 may be generally similar in construction to the guardrail 48 and include a plurality of the vertical channel posts 52, one or more stairway vertical channel posts 60, a top rail 62, an intermediate rail 64 and one or more toe plates 66. The top rail 62 and the intermediate rail 64 may be shaped to follow the contour of the stairway 44 and a corresponding portion of platform 42 above which the top rail 62 and the intermediate rail 64 are mounted. Consequently, the top rail 62 and the intermediate rail 64 may have horizontal portions above the platform 42 and attached to the vertical channel posts 52, and have bends 66 transitioning to inclined portions above the stairway 44 that are attached to one or more stairway vertical channel posts 60. The inclined portions of the top rail 62 and the intermediate rail 64 may be inclined at the same incline angle θs as stairway 44 to maintain a consistent height relative to the stairway 44. The stairway vertical channel post 60 may be a modified version of the vertical channel post 52 that may allow the inclined portions of the top rail 62 and the intermediate rail 64 to be attached and aligned parallel to each other and parallel to the incline angle θs of the stairway 44. The configurations of the vertical channel post 52 and the stairway vertical channel post 60 will be discussed more fully here after.

FIGS. 3-11 illustrate one embodiment of the vertical channel post 52 in accordance with the present disclosure.

Referring to FIG. 3-6, the vertical channel post 52 may include an end wall 70 having a first end wall edge 72, a second end wall edge 74 opposite the first end wall edge 72, an end wall top edge 76 and an end wall bottom edge 78 opposite the end wall top edge 76. A first side wall 80 of the vertical channel post 52 may have a first closed end edge 82 connected to the first end wall edge 72, a first open end edge 84 opposite the first closed end edge 82, a first side wall top edge 86 and a first side wall bottom edge 88 opposite the first side wall top edge 86. A second side wall 90 may approximate a mirror image of the first side wall 80 and have a second closed end edge 92 connected to the second end wall edge 74, a second open end edge 94 opposite the second closed end edge 92, a second side wall top edge 96 and a second side wall bottom edge 98 opposite the second side wall top edge 96. The end wall 70, the first side wall 80 and the second side wall 90 may define a channel 100 of the vertical channel post 52 and have a channel opening 102 defined by the first open end edge 84 and the second open end edge 94.

In some embodiments of the vertical channel post 52, the first side wall 80 and the second side wall 90 may be generally planar so that the channel 100 has a substantially rectangular or U-shaped cross-section. In other embodiments, such as that shown herein, the first side wall 80 and the second side wall 90 may be non-planar so that the channel 100 has desired cross-sections that may approximate but not exactly be rectangular or U-shaped, and the cross-sectional shape of the channel 100 may be varied along the length of the vertical channel post 52. Referring to FIG. 4, which is a bottom view of the vertical channel post 52, the first side wall 80 may have one or more bends to define multiple portions of the side wall. The first side wall 80 may include a closed end portion 80a extending away from the first end wall edge 72 of the end wall 70 toward a first side wall bend 80b. A side wall portion 80c of the first side wall 80 may extend away from the first side wall bend 80b toward a second side wall bend 80d, and an open end portion 80e may extend away from the second side wall bend 80d toward the first open end edge 84 and the channel opening 102. Similarly, the second side wall 90 may include a closed end portion 90a extending away from the second end wall edge 74 of the end wall 70 toward a first side wall bend 90b, a side wall portion 90c extending away from the first side wall bend 90b toward a second side wall bend 90d, and an open end portion 90e extending away from the second side wall bend 90d toward the second open end edge 94 and the channel opening 102.

The angles at which the closed end portions 80a, 90a extend from the end wall 70, and that the bends 80b, 90b, 80d, 90d create between the wall portions 80a, 90a, 80c, 90c, 80e, 90e, may be selected to achieve a desired cross-section of the vertical channel post 52 and size of the channel opening 102. For example, an angle between the end wall 70 and either the closed end portion 80a or the closed end portion 90a may be within a range from 118°-130°, an angle at the bends 80b, 90b between the close end portions 80a, 90a and the side wall portions 80c, 90c may be within a range from 145°-160°, and an angle at the bends 80d, 90d between the side wall portions 80c, 90c and the open end portions 80e, 90e may be within a range from 145°-165°. In one particular embodiment, the angle between the end wall 70 and either the closed end portion 80a or the closed end portion 90a may be approximately 124.5°±0.6°, the angle at the bends 80b, 90b may be approximately 151.5°±0.6°, and the angle at the bends 80d, 90d may be approximately 150.8°±0.6°. In an alternative embodiment, the angle between the end wall 70 and either the closed end portion 80*a* or the closed end portion 90*a* may be approximately 123.2°±0.6°, the angle at the bends 80*b*, 90*b* may be approximately 150.8°±0.6°, and the angle at the bends 80*d*, 90*d* may be approximately 156.9°±0.6°. Of course, other combinations and ranges of angles are contemplated depending on the requirements for a particular installation of the guardrails 48, 50, and those described herein are exemplary.

The cross-sectional shape of the vertical channel post 52 may taper as the vertical channel post 52 extends in the vertical direction so that the guardrail 48 meets strength requirements for protecting the operator and maintenance workers while reducing the material and weight of the guardrail 48, and correspondingly reducing cost, and providing ergonomic benefits. As shown in FIGS. 4 and 5, the end wall 70 may have an end wall width We that may decrease as the end wall 70 extends from the end wall bottom edge 78 toward the end wall top edge 76 so that the vertical channel post 52 is tapered from the bottom to the top. The end wall width We may decrease at a constant rate for uniform tapering of the vertical channel post 52, or the rate of decrease may be varied to achieve a desired geometry of the vertical channel post 52. The tapering of the vertical channel post 52 may also cause the channel opening 102 to be wider proximate the end wall bottom edge 78 and narrower proximate the end wall top edge 76. Proximate the end wall bottom edge 78, the end wall width We may be large enough to receive attachment hardware such as bolts to be inserted through corresponding post securement apertures 104 and washers that may be used to secure the vertical channel post 52 to the outward side of the platform 42, and similar hardware that may be used to secure the toe plate 58 to the vertical channel post 52 via toe plate securement apertures 106.

As shown in FIG. 4, the side walls 80, 90 may have a side wall width Ws and a side wall portion width Wsp that may be varied to achieve a desired profile of the vertical channel post 52. As shown particularly in FIG. 6, the vertical channel post 52 may be divided into a post lower portion 110 and a post upper portion 112. In the post lower portion 110, the side wall width Ws and the side wall portion width Wsp may be approximately constant so that the channel 100 has an approximately uniform depth. As the vertical channel post 52 transitions to the post upper portion 112 as shown in FIGS. 6 and 7, the side wall width Ws and/or the wall portion width Wsp may decrease as the side walls 80, 90 extend upward toward the top edges 76, 86, 96 so that the post upper portion 112 is tapered and the depth of the channel 100 is reduced as the post upper portion 112 extends upwardly.

Figure 7:
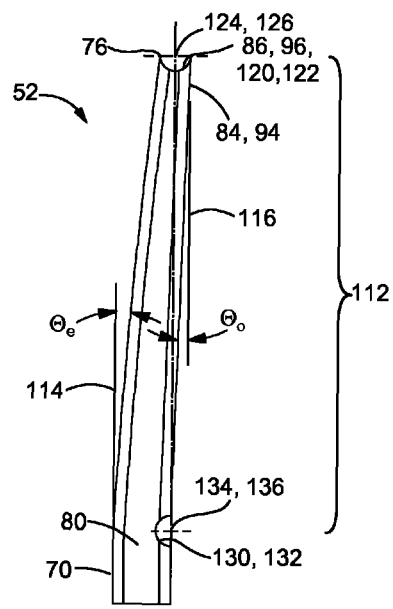
FIG. 7 is an enlarged side view of a post upper portion of the vertical channel post of FIG. 3.

As shown in FIG. 7, the end wall 70 in the post upper portion 112 may be angled and extend toward the end wall top edge 76 and toward the channel opening 102 at an end wall angle θe relative to a first vertical line 114. At the same time, the first open end edge 84 and the second open end edge 94 in the post upper portion 112 may be angled and extend upwardly toward the top edges 86, 96 and away from the end wall 70 at an open end edge angle θo relative to a second vertical line 116. The open end edge angle θo may be less than the end wall angle θe so that the side wall width Ws decreases as discussed above and the post upper portion 112 tapers when viewed from the side as the post upper portion 112 extends toward the top edges 76, 86, 96. In one embodiment, the end wall angle θe may be approximately 5° and the open end edge angle θo may be approximately 2°. The angling of the end wall 70 in the post upper portion 112 may widen the space provided for the operators and the maintenance workers on the platform 42.

Figure 8A:
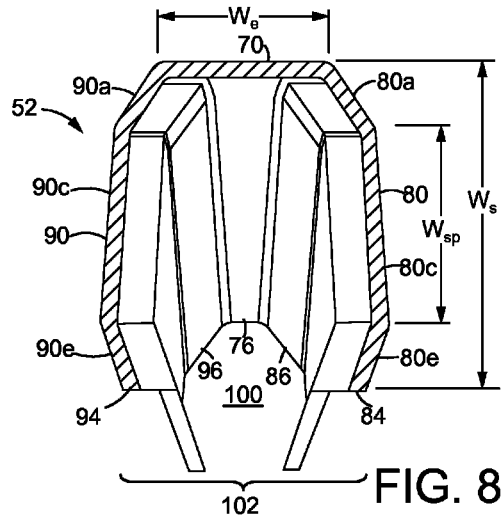
FIG. 8A is cross-sectional view taken through line 8A-8A in FIG. 6 of the vertical channel post of FIG. 3.
Figure 8B:
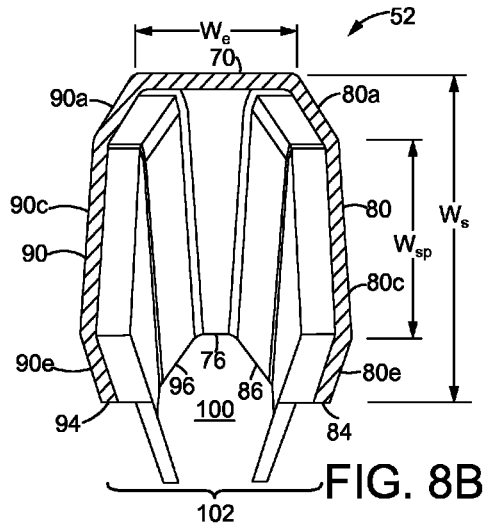
FIG. 8B is cross-sectional view taken through line 8B-8B in FIG. 6 of the vertical channel post of FIG. 3.
Figure 8C:
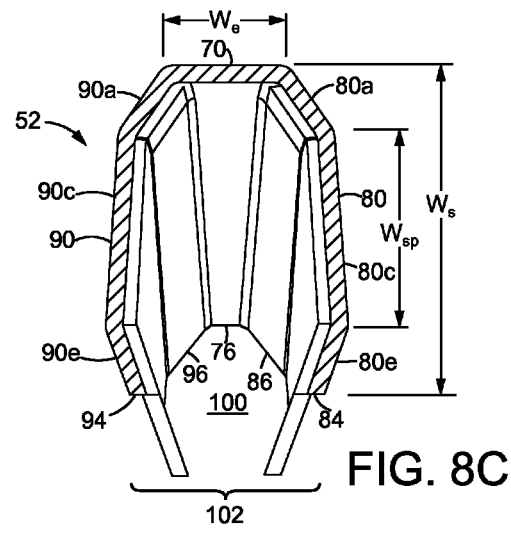
FIG. 8C is cross-sectional view taken through line 8C-8C in FIG. 6 of the vertical channel post of FIG. 3.

The configurations of the end wall 70 and the side walls 80, 90 and their variation to achieve desired cross-sections for the vertical channel post 52 are shown in greater in the sequence of cross-sectional views in FIGS. 8A-8F. The side wall portion width Wsp of each of side wall portions 80*c*, 90*c* of the first side wall 80 and the second side wall 90 may be constant from the end wall bottom edge 78 to the transition from the post lower portion 110 to the post upper portion 112. The side wall portion width Wsp may then decrease as the first side wall 80 and the second side wall 90 extend from the transition toward the end wall top edge 76 to achieve the tapering discussed above. As illustrated in FIGS. 8A-8C which is a sequence of cross-sections taken in the post lower portion 110 of the vertical channel post 52, the first side wall 80 and the second side wall 90 maintain a consistent size and shape in the post lower portion 110. At the same time, the end wall width We decreases as the end wall 70 extends from the end wall bottom edge 78. The distance between the first side wall 80 and the second side wall 90, and correspondingly the width of the channel 100, decreases as the end wall 70 extends from the end wall bottom edge 78 toward the transition between the post portions 110, 112. At the same time, the channel opening 102 between the first open end edge 84 and the second open end edge 94 will narrow.

Figure 8D:
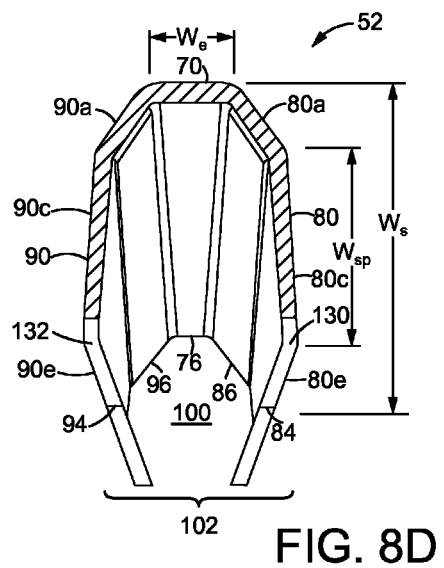
FIG. 8D is cross-sectional view taken through line 8D-8D in FIG. 6 of the vertical channel post of FIG. 3.
Figure 8E:
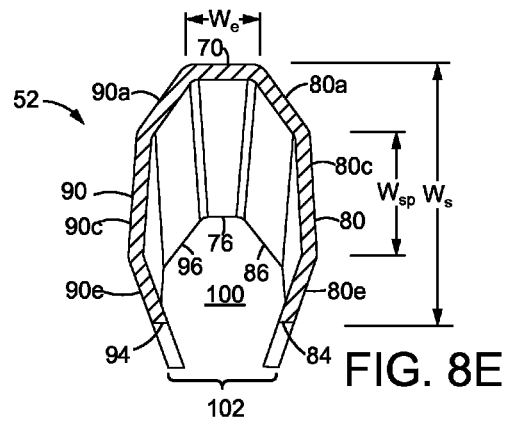
FIG. 8E is cross-sectional view taken through line 8E-8E in FIG. 6 of the vertical channel post of FIG. 3.
Figure 8F:
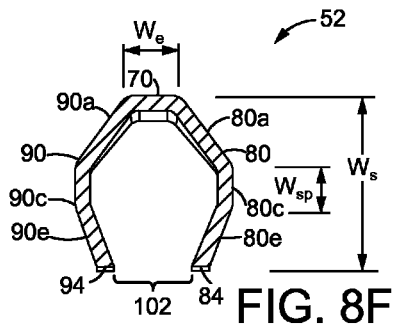
FIG. 8F is cross-sectional view taken through line 8F-8F in FIG. 6 of the vertical channel post of FIG. 3.

Above the transition as shown in the sequence of cross-sections in FIGS. 8D-8F, the end wall width We continues to decrease. Correspondingly, the channel 100 and the channel opening 102 continue to narrow as the post upper portion 112 approaches the end wall top edge 76. At the same time, the side wall portion width Wsp may decrease as the side walls 80, 90 extend from the transition toward the end wall top edge 76 so that the overall side wall width Ws decreases and the side walls 80, 90 taper as they approach the end wall top edge 76. Consequently, a depth of the channel 100 from the end wall 70 to the channel opening 102 decreases in the post upper portion 112. Though the end wall width We and the side wall portion width Wsp decrease as the end wall 70 and the side walls 80, 90 extend upwardly, the closed end portions 80*a*, 90*a* and the open end portions 80*e*, 90*e* may maintain approximately constant widths for the entire length of the vertical channel post 52. As the post upper portion 112 approaches the end wall top edge 76, the cross-sectional shape of the vertical channel post 52 may more closely approximate an arc shape or an octagonal shape having one side removed.

Figure 9:
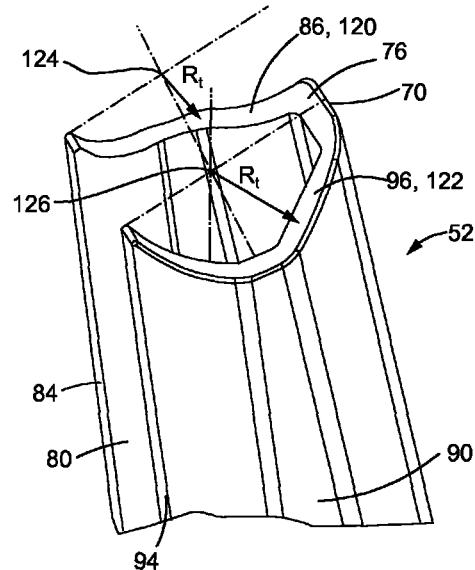
FIG. 9 is an isometric view of a post upper portion of the vertical channel post of FIG. 3 proximate a top edge.

The vertical channel post 52 may be configured for attachment of the top rail 54 and the intermediate rail 56 so that the rails 54, 56 may be parallel and vertically aligned when installed on the platform 42. For attachment of the top rail 54, a first top notch 120 may be defined by the first side wall top edge 86 of the first side wall 80 as best seen in FIGS. 7 and 9. A second top notch 122 may be defined by the second side wall top edge 96 of the second side wall 90. The first top notch 120 and the second top notch 122 may have similar configurations, and may be arc-shaped and have a first top notch center 124 and a second top notch center 126, respectively. The top notches 120, 122 may have a top notch radius Rt that is dimensioned relative to an outer diameter of the top rail 54 so that the top rail 54 may be inserted into and engaged by the side wall top edges 86, 96. The end wall top edge 76 may be positioned relative to the first top notch 120 and the second top notch 122 so that the end wall top edge 76 also engages the top rail 54 when the top rail 54 is received in and engaged by the top notches 120, 122 to provide additional contact between the vertical channel post 52 and the top rail 54 for added stability and contacting surfaces that can be secured by welds, adhesive or other appropriate attachment mechanism for connecting metallic parts used to attach the top rail 54 to the vertical channel post 52. The first top notch center 124 and the second top notch center 126 may be horizontally aligned (FIG. 7) so that the top rail 54 is oriented horizontally when installed between adjacent vertical channel posts 52 installed on the outward side of the platform 42 and vertically aligned.

Figure 10:
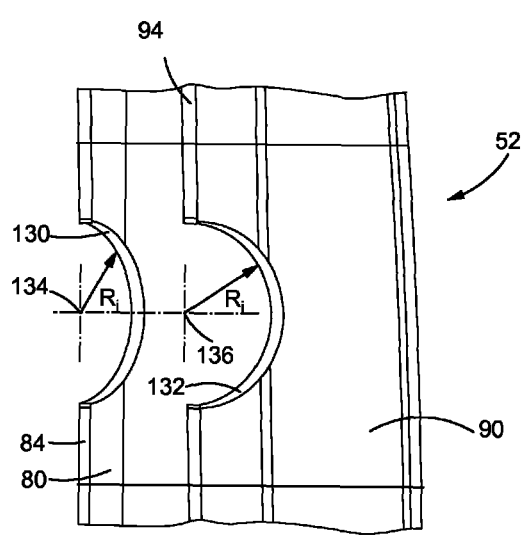
FIG. 10 is a front view of the post upper portion of the vertical channel post of FIG. 3 proximate the top edge.

For attachment of the intermediate rail 56, a first intermediate notch 130 may be defined by the first open end edge 84 of the first side wall 80, and a second intermediate notch 132 may be defined by the second open end edge 94 of the second side wall 90 as best seen in FIGS. 7 and 10. The intermediate notches 130, 132 may be disposed at any appropriate location along the side walls 80, 90 to position the intermediate rail 56 at an appropriate height above the platform 42 when the guardrail 48 is installed. In the illustrated embodiment, the intermediate notches 130, 132 are located proximate the transition between the post lower portion 110 and the post upper portion 112 (FIGS. 6 and 7) such that the side walls 80, 90 taper as they extend upwardly above the intermediate notches 130, 132. The first intermediate notch 130 and the second intermediate notch 132 may have similar configurations, and may be arc-shaped and have a first intermediate notch center 134 and a second intermediate notch center 136, respectively. The intermediate notches 130, 132 may have an intermediate notch radius Ri that is dimensioned relative to an outer diameter of the intermediate rail 56 so that the intermediate rail 56 may be inserted into and engaged by the open end edges 84, 94. The first intermediate notch center 134 and the second intermediate notch center 136 may be horizontally aligned (FIG. 7) so that the intermediate rail 56 is oriented horizontally when installed between adjacent vertical channel posts 52 installed on the outward side of the platform 42 and vertically aligned.

Figure 11:
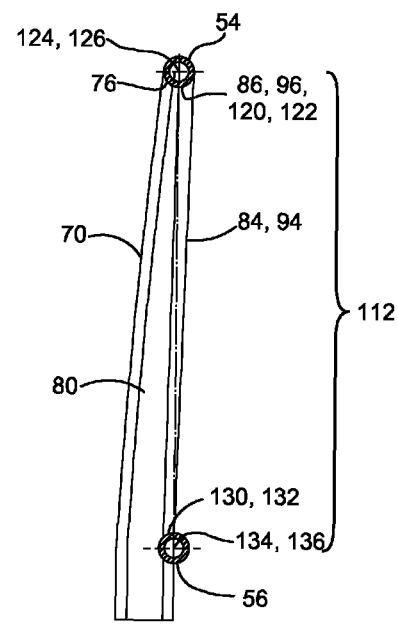
FIG. 11 is the enlarged side view of FIG. 7 with a top rail and an intermediate rail attached to the vertical channel post of FIG. 3 and shown in cross-section.

Each of the first top notch 120, the second top notch 122, the first intermediate notch 130 and the second intermediate notch 132 may define arcs that are less than 180° so that the top rail 54 and the intermediate rail 56 may be received therein and attached via the attachment mechanism. As the lengths of the arcs of the notches 120, 122, 130, 132 approach 180°, cutouts (not shown) of material proximate the ends of the arcs of the notches 120, 122, 130, 132 may be made to open up the notches 120, 122, 130, 132 and provide additional space for receiving the respective top rail 54 and intermediate rail 56. The top notches 120, 122 and the intermediate notches 130, 132 may be aligned so that the top rail 54 and the intermediate rail 56 are parallel and vertically aligned when the vertical channel posts 52 are installed on the platform 42 and oriented vertically. As shown in FIG. 11, the top notch centers 124, 126 and the intermediate notch centers 134, 136 may be aligned along parallel lines so that the top rail 54 and the intermediate rail 56 are parallel to each other and to the platform 42. At the same time, the end wall angle θe of the end wall 70 and the open end edge angle θo of the open end edges 84, 94 of the side walls 80, 90 in the post upper portion 112 may position the side wall top edges 86, 96 above the intermediate notches 130, 132. In this position, the top notch centers 124, 126 may be approximately vertically aligned above the intermediate notch centers 134, 136 when the vertical channel posts 52 are installed and vertically aligned, and the top rail 54 and the intermediate rail 56 attached to the vertical channel posts 52 may be approximately vertically aligned with the top rail 54 above the intermediate rail 56.

Figure 12:
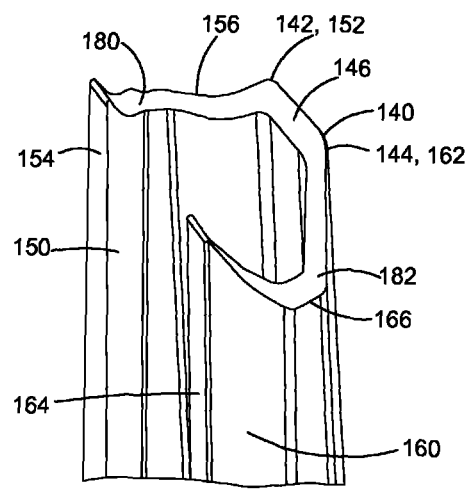
FIG. 12 is an isometric view of a post upper portion of an alternative embodiment of vertical channel post for stairways proximate a top edge.
Figure 13:
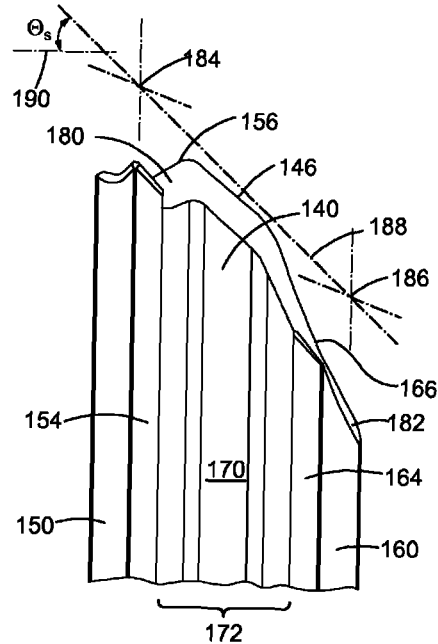
FIG. 13 is a front view of the post upper portion of the vertical channel post of FIG. 12.

The stairway vertical channel post 60 may have generally the same configuration as the vertical channel post 52 illustrated and described above, but may be configured to align the top rail 62 and the intermediate rail 64 parallel to the incline angle θs of the stairway 44. Referring to FIGS. 12 and 13, the stairway vertical channel post 60 may have an end wall 140 having a first end wall edge 142, a second end wall edge 144 opposite the first end wall edge 142, and an end wall top edge 146. A first side wall 150 of the stairway vertical channel post 60 may have a first closed end edge 152 connected to the first end wall edge 142, a first open end edge 154 opposite the first closed end edge 152, and a first side wall top edge 156. A second side wall 160 of the stairway vertical channel post 60 may approximate a mirror image of the first side wall 150 and have a second closed end edge 162 connected to the second end wall edge 144, a second open end edge 164 opposite the second closed end edge 162, and a second side wall top edge 166. The end wall 140, the first side wall 150 and the second side wall 160 may define a channel 170 of the stairway vertical channel post 60 and have a channel opening 172 defined by the first open end edge 154 and the second open end edge 164.

For attachment of the stairway top rail 62, a first top notch 180 may be defined by the first side wall top edge 156 of the first side wall 150. A second top notch 182 may be defined by the second side wall top edge 166 of the second side wall 160. The first top notch 180 and the second top notch 182 may be configured to receive and engage the stairway top rail 62 when it is oriented at the incline angle θs. A first top notch center 184 of the first top notch 180 and a second top notch center 186 of the second top notch 182 may be aligned along a line 188 that is oriented at the incline angle θs relative to a horizontal line 190 when the stairway vertical channel post 60 is mounted to the outward side of the stairway 44 and oriented vertically. Configured in this way, the stairway top rail 62 is oriented parallel to the stairway 44 when installed between adjacent stairway vertical channel posts 60 and the guardrail 50 is installed on the outward side of the stairway 44 as shown in FIG. 2.

Figure 14:
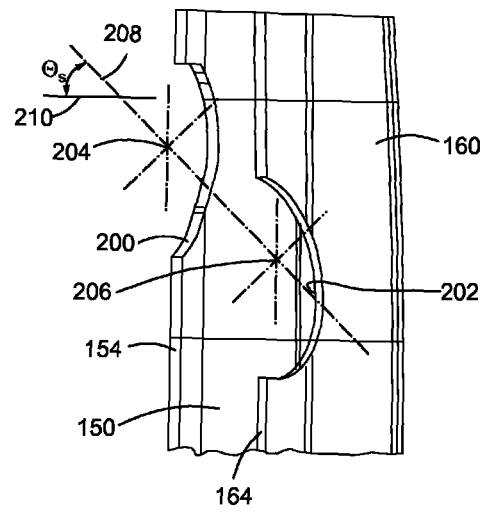
FIG. 14 is an isometric view of a transition between the post upper portion and a post lower portion of the vertical channel post of FIG. 12.
Figure 15:
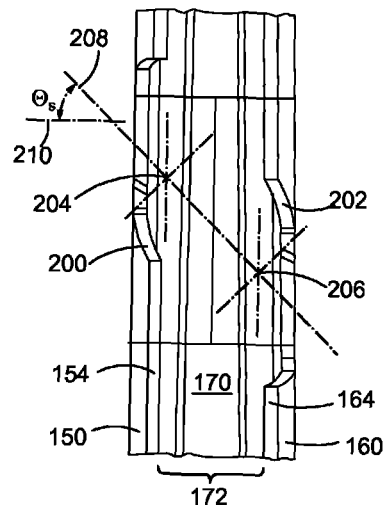
FIG. 15 is a front view of the transition of the vertical channel post of FIG. 12.

For attachment of the stairway intermediate rail 64, a first intermediate notch 200 may be defined by the first open end edge 154 of the first side wall 150, and a second intermediate notch 202 may be defined by the second open end edge 164 of the second side wall 160 as shown in FIGS. 14 and 15. The intermediate notches 200, 202 may be disposed at any appropriate location along the side walls 150, 160 to position the stairway intermediate rail 64 at an appropriate height above the stairway 44 when the guardrail 50 is installed. The first intermediate notch 200 and the second intermediate notch 202 may be configured in a similar manner as the top notches 180, 182 to receive the stairway intermediate rail 64 when it is oriented at the incline angle θs. A first intermediate notch center 204 of the first intermediate notch 200 and a second intermediate notch center 206 of the second intermediate notch 202 may be aligned along a line 208 that is oriented at the incline angle θs relative to a horizontal line 210, and parallel to the line 188, when the stairway vertical channel post 60 is mounted to the outward side of the stairway 44 and oriented vertically. When installed between adjacent stairway vertical channel posts 60 and the guardrail 50 is installed on the outward side of the stairway 44 as shown in FIG. 2, the stairway intermediate rail 64 is oriented parallel to the stairway 44 and to the stairway top rail 62.

Each of the top notches 180, 182 and the intermediate notches 200, 202 may define arcs that are less than 180° for receiving the stairway top rail 62 and the stairway intermediate rail 64, respectively. As the lengths of the arcs of the notches 180, 182, 200, 202 approach 180°, cutouts (not shown) of material proximate the ends of the arcs of the notches 180, 182, 200, 202 may be made to open up the notches 180, 182, 200, 202 and provide additional space for receiving the respective top rail 62 and intermediate rail 64. The top notches 180, 182 and the intermediate notches 200, 202 may be aligned so that the stairway top rail 62 and the stairway intermediate rail 64, in addition to being parallel as discussed above, are vertically aligned when the vertical channel posts 52 are installed on the platform 42 and oriented vertically. In a similar manner as in the vertical channel post 52, the end wall 140 may extend at the end wall angle θe and the open end edges 154, 164 may extend at the open end edge angle θo in a post upper portion of the stairway vertical channel post 60 to position the side wall top edges 156, 166 above the intermediate notches 200, 202. In this position, the top notch centers 184, 186 may be approximately vertically aligned above the intermediate notch centers 204, 206 when the stairway vertical channel posts 60 are installed and vertically aligned, with the stairway top rail 62 and the stairway intermediate rail 64 being approximately vertically aligned with the stairway top rail 62 above the stairway intermediate rail 64.

In an alternative embodiment of the stairway guardrail 50, guardrail channel posts (not shown) may be mounted at 90 degrees or perpendicular relative to the incline angle θs of the stairway 44 and the incline of the rails 62, 64 above the stairway 44. In such an embodiment, the top notches and the intermediate notches may be aligned as illustrated FIGS. 5-11 and discussed above for the vertical channel posts 52 to receive and engage the top rail 62 and the intermediate rail 64. Post upper and lower portions of the inclined channel posts may be dimensioned to span the distances between the top rail 62 and the intermediate rail 64, and the intermediate rail 64 and the stairway 44, respectively, with the transition there between and the intermediate notches being positioned where necessary to receive the intermediate rail 64. The inclined channel posts of the embodiment may be shorter than the vertical channel posts 60, thereby reducing the weight of the inclined channel posts and the cost of material in fabricating the inclined channel posts.

In some implementations of mounting guardrails on walkways of machines 10, it may not be practical to mount the vertical channel posts 52, 60 to the outward side of the walkway. For instance, where the walkway is on a platform of the machine 10 but disposed inward from the outward edge of the platform, it may be necessary to mount the guardrail to an upper surface of the platform. FIG. 16 illustrates one example of a surface mounted guardrail 220 in accordance with the present disclosure configured for mounting to an upper surface of a platform. The guardrail 220 may include a plurality of vertical channel posts 222 that may be mounted to an upper surface of a platform by post mounting brackets 224 that may vertically align the vertical channel posts 222. The guardrail 220 may also include a top rail 226 and an intermediate rail 228 connected to the vertical channel posts 222 in a similar manner as the top rails 54, 62 and intermediate rails 56, 64 are connected to the vertical channel posts 52, 60, respectfully, as illustrated and described above.

The vertical channel posts 222 (FIGS. 17 and 18) may have the same general configuration as the vertical channel posts 52, 60, and may include an end wall 230, a first side wall 232 and a second side wall 234, with the side walls 232, 234 having top notches 236, 238 and intermediate notches 240, 242 for connection of the top rail 226 and the intermediate rail 228. The intermediate notches 240, 242 may be positioned along the side walls 232, 234 at a transition between a post lower portion 244 and a post upper portion 246. Because the vertical channel post 222 will be mounted to the upper surface of the platform instead of an outward side, the post lower portion 244 may be shorter than the post lower portion 110 of the vertical channel posts 52, 60 that typically must extend below the upper surface of the walkway arrangement 40 to be secured to the outward surface. Additionally, the separate post securement apertures 104 and toe plate securement apertures 106 are replaced by combined post and toe plate securement apertures 248 in the end wall 230 of the vertical channel post 222 for receiving attachment hardware for securing the post mounting bracket 224 and a toe plate 250 to the vertical channel post 222.

The post mounting bracket 224 as shown in FIG. 19 may be formed via stamping or other appropriate fabrication operation from a unitary metal plate. The post mounting bracket 224 may include a vertical support wall 260 having a bracket width Wb that is greater than the end wall width We of the end wall 260 at the post lower portion 244 so the post mounting bracket 224 can receive the vertical channel post 222. The post mounting bracket 224 may further include a first side wall 262 and a second side wall 264 extending from opposite edges of the vertical support wall 260 to define a post receiving channel 266 that will receive the post lower portion 244 of the vertical channel post 222. The post mounting bracket 224 may also include a first bottom wall 268 extending from a bottom edge of the first side wall 262 and a second bottom wall 270 extending from a bottom edge of the second side wall 264.

The bottom walls 268, 270 are disposed below the vertical support wall 260 and approximately parallel to each other, and form an approximately planar bottom surface that will face and engage the upper surface of the platform to orient the vertical support wall 260 approximately vertically. The vertical support wall 260 may include a plurality of post and toe plate securement apertures 272 that correspond to the apertures 248 of the vertical channel post 222. The bottom walls 268, 270 may each have at least one bracket mounting aperture 274, 276, respectively, for receiving attachment hardware for securing the post mounting bracket 224 to the platform 42.

INDUSTRIAL APPLICABILITY

The guardrails in accordance with the present disclosure may facilitate fabrication of the guardrails and installation on the machines 10. Because the vertical channel posts 52, 60, 222 are stamped, cast or otherwise formed with notches that are configured to receive the top rails 54, 62, 226 and the intermediate rails 56, 64, 228, the top rails 54, 62, 226 and intermediate rails 56, 64, 228 need only be cut to the proper length and do not require any other forming or modification to be assembled with the vertical channel posts 52, 60, 222. The open-channel design of the vertical channel posts 52, 60, 222 allows the guardrails to be mounted on the outward sides of the walkways and stairways without the need for additional mounting brackets. The end walls 70, 140 face and engage the outward sides, and the channels 100, 170 face outwardly for reception of the attachment hardware. The vertical channel posts 52, 60, 222 may be dimensioned wide enough to provide sufficient access for inserting the attachment hardware and tools into the channels 100, 170. The additional size of the vertical channel posts 52, 60, 222 near the bottom and at the point of attachment to the machine 10 may increase the strength of the vertical channel posts 52, 60, 222 and the guardrail overall, while at the same time reducing vibration in the guardrail.

At the same time the vertical channel posts 52, 60, 222 may be widened at the bottom to facilitate assembly and add strength, the vertical channel posts 52, 60, 222 taper from bottom to top in both their width and their depth to size that still allows the top rails 54, 62, 226 and intermediate rails 56, 64, 228 to be connected. The tapering of the vertical channel posts 52, 60, 222 may reduce the material required for fabrication and the weight of the guardrails. This may result in a corresponding reduction in cost for the guardrails due to reduced material costs and a measure of improved efficiency in operating the machine 10. The smaller size of the vertical channel posts 52, 60, 222 proximate the top may also increase the visibility provided to the operator in the operator station 22 over the work area as work is performed on the work material and the machine 10 is driven over a work surface 12.

The configuration of the guardrails may also facilitate attachment of other components of the machine 10 and equipment to the guardrails. In contrast to tubular posts, the vertical channel posts 52, 60, 222 provide multiple planar surface to which components and equipment may be stably secured with minimal or no additional attachment hardware. Some known guardrail configurations require additional plates for mounting gate hinges to the vertical posts, with the plates restricting the gates to swing in only one direction. With the present vertical channel posts 52, 60, 222, gates may be installed with reversible gate hinges so that a customer purchasing the machine 10 may have the option of having the gate swing in a preferred direction. The planar surfaces also facilitate mounting of lights proximate the toe plates 58, 66, 250 to illuminate the walkways, platforms and stairways without the necessity of additional mounting plates or brackets that are typically necessary for mounting lights on tubular vertical posts.

While the preceding text sets forth a detailed description of numerous different embodiments, it should be understood that the legal scope of protection is defined by the words of the claims set forth at the end of this patent. The detailed description is to be construed as exemplary only and does not describe every possible embodiment since describing every possible embodiment would be impractical, if not impossible. Numerous alternative embodiments could be implemented, using either current technology or technology developed after the filing date of this patent, which would still fall within the scope of the claims defining the scope of protection.

It should also be understood that, unless a term was expressly defined herein, there is no intent to limit the meaning of that term, either expressly or by implication, beyond its plain or ordinary meaning, and such term should not be interpreted to be limited in scope based on any statement made in any section of this patent (other than the language of the claims). To the extent that any term recited in the claims at the end of this patent is referred to herein in a manner consistent with a single meaning, that is done for sake of clarity only so as to not confuse the reader, and it is not intended that such claim term be limited, by implication or otherwise, to that single meaning.

What is claimed is:

1. A vertical channel post for a guardrail for a walkway on a machine, comprising:

an end wall having a first end wall edge, a second end wall edge opposite the first end wall edge, an end wall top edge and an end wall bottom edge opposite the end wall top edge;

a first side wall having a first closed end edge connected to the first end wall edge, a first open end edge opposite the first closed end edge, a first side wall top edge and a first side wall bottom edge opposite the first side wall top edge; and a second side wall having a second closed end edge connected to the second end wall edge, a second open end edge opposite the second closed end edge, a second side wall top edge and a second side wall bottom edge opposite the second side wall top edge, wherein the end wall, the first side wall and the second side wall define a channel having channel opening defined by the first open end edge and the second open end edge, wherein the first side wall includes a first top notch defined by the first side wall top edge and the second side wall includes a second top notch defined by the second side wall top edge, and the first top notch and the second top notch are arc-shaped and aligned to receive a top rail of the guardrail, and wherein the first side wall includes a first intermediate notch defined by the first open end edge and the second side wall includes a second intermediate notch defined by the second open end edge, and the first intermediate notch and the second intermediate notch are arc-shaped and aligned to receive an intermediate rail of the guardrail.

2. The vertical channel post of claim 1, wherein the first top notch has a first top notch center, the second top notch has a second top notch center, the first intermediate notch has a first intermediate notch center and the second intermediate notch has a second intermediate notch center, wherein the first top notch center, the second top notch center, the first intermediate notch center and the second intermediate notch center are aligned so that the top rail and the intermediate rail are parallel and vertically aligned when the top rail is received and engaged by the first top notch and the second top notch, the intermediate rail is received and engaged by the first intermediate notch and the second intermediate notch, and the vertical channel post is oriented vertically.

3. The vertical channel post of claim 2, wherein the first top notch center and the second top notch center are horizontally aligned so that the top rail is oriented horizontally, and the first intermediate notch center and the second intermediate notch center are horizontally aligned so that the intermediate rail is oriented horizontally and parallel to the top rail.

4. The vertical channel post of claim 2, wherein the walkway on the machine is a stairway having an incline angle relative to a horizontal line, and wherein the first top notch center and the second top notch center are aligned parallel to the incline angle when the vertical channel post is oriented vertically so that the top rail is oriented parallel to the incline angle of the stairway, and the first intermediate notch center and the second intermediate notch center are aligned parallel to the incline angle when the vertical channel post is oriented vertically so that the intermediate rail is oriented parallel to the incline angle of the stairway and parallel to the top rail.

5. The vertical channel post of claim 1, wherein each of the first top notch, the second top notch, the first intermediate notch and the second intermediate notch define an arc of less than 180°.

6. The vertical channel post of claim 1, wherein the end wall top edge engages the top rail when the top rail is received in and engaged by the first top notch and the second top notch.

7. The vertical channel post of claim 1, wherein an end wall width of the end wall decreases such that a distance between the first side wall and the second side wall decreases as the end wall extends from the end wall bottom edge toward the end wall top edge.

8. The vertical channel post of claim 1, wherein a side wall width of the first side wall and the second side wall decreases such that a distance between the end wall and the channel opening decreases as the first side wall and the second side wall extend from the first intermediate notch and the second intermediate notch toward the first side wall top edge and the second side wall top edge.

9. The vertical channel post of claim 1, wherein the vertical channel post comprises a post upper portion above the first intermediate notch and the second intermediate notch, and a post lower portion below the first intermediate notch and the second intermediate notch, wherein the end wall in the post upper portion extends toward the end wall top edge at an end wall angle relative to a first vertical line toward the channel opening.

10. The vertical channel post of claim 9, wherein the first open end edge and the second open end edge in the post upper portion extend toward the first side wall top edge and the second side wall top edge at an open end edge angle relative to a second vertical line away from the end wall.

11. The vertical channel post of claim 10, wherein the end wall angle is approximately 5° and the open end edge angle is approximately 2°.

12. The vertical channel post of claim 1, wherein each of the first side wall and the second side wall comprises a closed end portion extending away from the end wall toward a first side wall bend, a side wall portion extending away from the first side wall bend toward a second side wall bend, and an open end portion extending away from the second side wall bend toward the channel opening.

13. The vertical channel post of claim 12, wherein an end wall width of the end wall decreases as the end wall extends from the end wall bottom edge toward the end wall top edge, and wherein a side wall portion width of each of the side wall portions of the first side wall and the second side wall decreases as the first side wall and the second side wall extend from the first intermediate notch and the second intermediate notch toward the first side wall top edge and the second side wall top edge.

14. A guardrail for a walkway on a machine, comprising:
a top rail;
an intermediate rail; and
a first vertical channel post and a second vertical channel post, each of the first vertical channel post and the second vertical channel post comprising:
an end wall having an end wall top edge and an end wall bottom edge opposite the end wall top edge,
a first side wall extending from a first end wall edge of the end wall and having a first open end edge opposite the end wall, and
a second side wall extending from a second end wall edge of the end wall and having a second open end edge opposite the end wall, wherein the end wall, the first side wall and the second side wall define a channel having a channel opening defined by the first open end edge and the second open end edge,
a first top notch defined by a first side wall top edge, being arc-shaped and having a first top notch center,
a second top notch defined by a second side wall top edge, being arc-shaped and having a second top notch center aligned with the first top notch center to receive and engage the top rail,
a first intermediate notch defined by the first open end edge, being arc-shaped and having a first intermediate notch center, and
a second intermediate notch defined by the second open end edge, being arc-shaped and having a second intermediate notch center aligned with the first intermediate notch center to receive and engage the intermediate rail.

15. The guardrail of claim 14, wherein the first top notch center, the second top notch center, the first intermediate notch center and the second intermediate notch center of the first vertical channel post and the second vertical channel post are aligned so that the top rail and the intermediate rail are parallel and vertically aligned when the end walls of the first vertical channel post and the second vertical channel post are secured to the walkway proximate the end wall bottom edges such that the first vertical channel post and the second vertical channel post are oriented vertically.

16. The guardrail of claim 15, wherein the first top notch centers and the second top notch centers are horizontally aligned so that the top rail is oriented horizontally, and the first intermediate notch centers and the second intermediate notch centers are horizontally aligned so that the intermediate rail is oriented horizontally and parallel to the top rail.

17. The guardrail of claim 15, wherein the walkway on the machine is a stairway having an incline angle relative to a horizontal line, and wherein the first top notch centers and the second top notch centers are aligned parallel to the incline angle when the first vertical channel post and the second vertical channel post are oriented vertically so that the top rail is oriented parallel to the incline angle of the stairway, and the first intermediate notch centers and the second intermediate notch centers are aligned parallel to the incline angle when the first vertical channel post and the second vertical channel post are oriented vertically so that the intermediate rail is oriented parallel to the incline angle of the stairway and parallel to the top rail.

18. A vertical channel post for a guardrail for a walkway on a machine, comprising:
an end wall having a first end wall edge, a second end wall edge opposite the first end wall edge, an end wall bottom edge and an end wall top edge opposite the end wall bottom edge;
a first side wall having a first closed end edge connected to the first end wall edge, a first open end edge opposite the first closed end edge, a first side wall bottom edge, a first side wall top edge opposite the first side wall bottom edge, a first top notch being arc-shaped and having a first top notch center defined by the first side wall top edge, and a first intermediate notch being arc-shaped and having a first intermediate notch center defined by the first open end edge; and
a second side wall having a second closed end edge connected to the second end wall edge, a second open end edge opposite the second closed end edge, a second side wall bottom edge, a second side wall top edge opposite the second side wall bottom edge, a second top notch being arc-shaped and having a second top notch center defined by the second side wall top edge, and a second intermediate notch being arc-shaped and having a second intermediate notch center defined by the second open end edge, wherein the end wall, the first side wall and the second side wall define a channel having a channel opening defined by the first open end edge and the second open end edge, wherein the first top notch and the second top notch are aligned to receive a top rail of the guardrail, the first intermediate notch and the second intermediate notch are arc-shaped and aligned to receive an intermediate rail of the guardrail, and the first top notch center, the second top notch center, the first intermediate notch center and the second intermediate notch center are aligned so that the top rail and the intermediate rail are parallel and vertically aligned when the top rail is received and engaged by the first top notch and the second top notch, the intermediate rail is received and engaged by the first intermediate notch and the second intermediate notch, and the vertical channel post is oriented vertically, wherein the end wall above the first intermediate notch and the second intermediate notch extends toward the end wall top edge at an end wall angle relative to a first vertical line toward the channel opening and the first open end edge and the second open end edge above the first intermediate notch and the second intermediate notch extend toward the first side wall top edge and the second side wall top edge at an open end edge angle relative to a second vertical line away from the end wall.

19. The vertical channel post of claim 18, wherein the walkway on the machine is a stairway having an incline angle relative to a horizontal line, and wherein the first top notch center and the second top notch center are aligned parallel to the incline angle when the vertical channel post is oriented vertically so that the top rail is oriented parallel to the incline angle of the stairway, and the first intermediate notch center and the second intermediate notch center are aligned parallel to the incline angle when the vertical channel post is oriented vertically so that the intermediate rail is oriented parallel to the incline angle of the stairway and parallel to the top rail.

20. The vertical channel post of claim 18, wherein an end wall width of the end wall decreases such that a distance between the first side wall and the second side wall decreases as the end wall extends from the end wall bottom edge toward the end wall top edge, and wherein a side wall width of the first side wall and the second side wall decreases as the first side wall and the second side wall extend from the first intermediate notch and the second intermediate notch toward the first side wall top edge and the second side wall top edge.

* * * * *